United States Patent [19]

Eitzmann et al.

[11] Patent Number: 5,455,627
[45] Date of Patent: Oct. 3, 1995

[54] PROGRAMMABLE VIDEO OUTPUT FORMAT GENERATOR

[75] Inventors: Gregory M. Eitzmann; John D. Hallesy, both of Palo Alto; John A. Klenoski, Fremont; Greg Sadowski, Santa Clara; David L. Dignam, Belmont; Nathaniel D. Naegle, Pleasanton, all of Calif.

[73] Assignee: Silicon Graphics, Inc., Mountain View, Calif.

[21] Appl. No.: 85,089

[22] Filed: Jun. 30, 1993

[51] Int. Cl.⁶ .................................. H04N 7/01; H04N 5/04
[52] U.S. Cl. .......................... 348/441; 348/552; 348/555; 364/413.13
[58] Field of Search ...................................... 358/140, 141, 358/148, 11, 12; 364/413.13, 415; 345/213, 211, 154, 155; 348/441, 443, 552, 555; H04N 7/01, 5/04

[56] References Cited

U.S. PATENT DOCUMENTS

| | | | |
|---|---|---|---|
| 4,764,870 | 8/1988 | Haskin | 364/415 |
| 4,872,054 | 10/1989 | Gray et al. | 358/140 |
| 4,905,167 | 2/1990 | Yamaoka et al. | 364/521 |
| 4,935,731 | 6/1990 | Takebe et al. | 345/213 |
| 4,991,023 | 2/1991 | Nicols | 345/213 |

*Primary Examiner*—James J. Groody
*Assistant Examiner*—Glenton B. Burgess

[57] ABSTRACT

A programmable video output format (VOF) generator that enables a processing system to drive different video display devices with varying video format requirements. The programmable VOF generator includes a compiler that generates video formats based on user input, and a state machine that generates all video signals with requisite output format. The compiler allows the user to provide minimal information on general display parameters using a high-level language. Therefore, no specialized knowledge of the video display hardware requirements is required from the user.

4 Claims, 3 Drawing Sheets

PROGRAMMABLE VIDEO OUTPUT FORMAT GENERATOR

BACKGROUND OF THE INVENTION

This invention relates in general to video formats for displaying information on a raster scan display device, and in particular to a video output format compiler and programmable video output formatter that can be programmed to produce different video formats to meet different display requirements.

Video formats were developed as methods of displaying picture element (or pixel) information on a raster display device such as a cathode-ray tube (CRT). The picture on a CRT screen is "painted" by an electron beam that is accelerated toward the phosphor coated screen by a high positive voltage near the face of the tube. When the electrons hit the screen, the phosphor emits visible light. The electron beam makes a horizontal scan by moving along a horizontal line across the screen from left to right, and makes a vertical scan by incrementally moving down in the vertical direction until it reaches the bottom of the screen. As the beam completes all the horizontal scans in a single vertical scan, a frame is displayed. Because the phosphor's light output decays exponentially with time, the entire picture (or frame) must be refreshed (redrawn) many times per second so that the viewer sees what appears to be a constant, unflickering picture. This is referred to as the vertical field rate.

Video display devices are characterized by a particular scan rate, which specifies the number of scanning lines per frame, and the vertical field rate. A display device is further characterized by a specified horizontal resolution which is the number of pixels per line, and vertical resolution which is the number of lines per raster scan frame. The timing relationship between these signals is governed by a synchronization method which is a complex combination of horizontal and vertical timing (pulse) information that controls the decoding of the video signal by a display device or other video processing equipment.

These video signal specifications are generally referred to as a video format. A video format represents a periodic sequence of a time-varying signal (or signals) that defines the method by which pixel information has been encoded, horizontal and vertical resolution and synchronization method.

Based on the operating requirements of traditional television equipment, a set of standards defining video formats were developed. However, new and varied applications for display devices requiring different scan rates and resolutions soon brought deviations from those standards. As a result, over the years, many different standards have been developed (e.g. NTSC, PAL, RS-343 and RGB), with each employing different scan rates.

The variety in display devices that require different video formats has led to interfacing problems between different display devices and existing systems. For example, for a computer to connect to different monitors, it's video output format must be modified to meet the requirements of the target monitor.

At present, changing the video output format of a given processing system must be done either by modifying the hardware, or through a complex set of hardware-specific instructions. The hardware-only solution requires an alteration of hardware to change the video output format, which in some instances may necessitate as much as a new display generator. The second approach requires an expert knowledge of the operation of the hardware to develop a complex and tedious description of the format. Thus, both approaches tend to be very inefficient and costly.

There is, therefore, a need for a more efficient solution to the problem of generating multiple video formats for a single processing system that may connect to several different display devices.

SUMMARY OF THE INVENTION

The present invention provides a programmable video output format (VOF) generator that enables a processing system to drive an arbitrary display device with minimal input information.

The VOF generator of the present invention includes a video format compiler that allows the user to input (using a high-level language) information on display parameters that is commonly available with specialized monitors. The compiler then uses this information to derive all other signals based on a body of knowledge of the underlying hardware. The information on video hardware operation, embedded in the video format compiler, is general enough that the compiler can produce specifications of a large variety of formats from a description that does not require specialized knowledge of the internal operation. The output of the video format compiler is downloaded to a reprogrammable state machine that implements the video output format. The state machine or video output formatter generates all required video signals with the requisite timing and content to drive the target monitor.

Therefore, the programmable video output format generator of the present invention requires only a minimum set of information provided by the user in the form of a high-level computer program to allow, for example, a computer terminal to connect to a variety of display monitors.

A further understanding of the nature and advantages of the present invention may be gained by reference to the following detailed description and drawings.

DESCRIPTION OF THE SPECIFIC EMBODIMENTS

Figure 1:
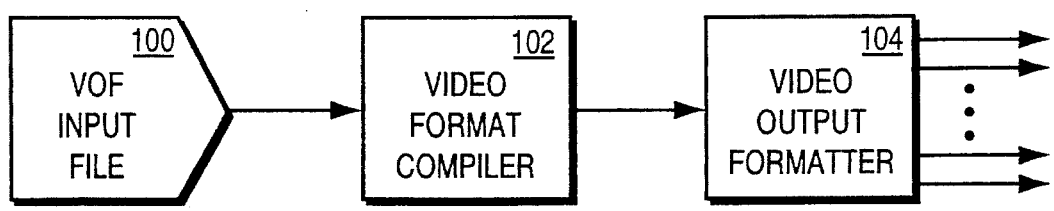
FIG. 1 is a top level block diagram of the programmable video output format generator of the present invention.

The programmable video output format generator of the present invention comprises two basic functional blocks: a video format compiler and a video output formatter. As shown in FIG. 1, the video format compiler 102 receives a video output format (VOF) input file 100 at its input. The VOF input file 100 is a brief, high-level description of the synchronization (sync) signal pattern, as provided by the target display device specifications. Based on this input information and a pre-determined timing specification, the compiler 102 generates a set of instructions at its output that describes the different portions of the frame. The output of the compiler 102 loads onto the state machine of the video output formatter 104. The video output formatter 104 repetitively executes the set of instructions to generate a set of video signals with the proper format to drive the video display device.

The contents of the VOF input file 100 describe a single frame of video by specifying, primarily, the sync signal pattern throughout the frame. The sync information includes horizontal sync, that is a pulse which starts at the end of every scan line, and vertical sync, that is a sequence of pulses which start at the end of each field/frame. The purpose of the horizontal sync is to mark the interval between the end of one line and the beginning of another. The amount of time the horizontal sync pulse is active at the end of the line is known as horizontal front porch, and the amount of time the horizontal sync pulse is active at the beginning of the line is known as horizontal back porch. The horizontal sync interval extends from the end of the previous line to the beginning of the next.

The purpose of vertical sync pulses is to mark the time interval between the end of one field/frame and the next. The amount of time that the vertical sync pulses are active at the end of a field/frame is known as vertical front porch, and the amount of time that the vertical sync pulse is active at the beginning of the field/frame is known as vertical back porch. The vertical sync interval extends from the end of the previous field/frame to the beginning of the next.

Horizontal and vertical blanking, which can be derived from horizontal and vertical sync information, is used to reduce the video signal to black levels while the beam is in horizontal or vertical retrace.

The user provides the above sync information (which is readily available for most specialized display devices) by creating the VOF input file 100. The VOF input file 100 may be a plain text file which the user can create using a text editor of their choice. Table 1 shows one example of a VOF input file 100, it is the normal high-resolution screen to which factory-shipped machines default. Table 1 also helps illustrate the type of information required by the compiler 102.

TABLE 1

Sample Program

```
1     /*
2     * This is the high-resolution format
3     */
4
5     FieldsPerFrame = 1;
6     FramesPerSecond = 60;
7     TotalLinesPerFrame = 1065;
8     TotalPixelsPerLine = 1680;
9     ActiveLinesPerFrame = 1024;
10    ActivePixelsPerLine = 1280;
11
12    HorizontalFrontPorch = 40;
13    HorizontalSync = 120;
14    HorizontalBackPorch = 240;
15
16    Field 0 =
17    {
18            Initial High
19            VerticalFrontPorch =
20            {
21                    3 * {
22                            Length =
                                1.0H,
23                            Low = 0
24                            High =
```

TABLE 1-continued

Sample Program

```
25                            Horizontal-
                                Sync
26                    }
27
28            VerticalSync =
29            {
30                    3 * {
31                            Length =
                                1.0H,
32                            Low = 0
33                    }
34            }
35
36            Initial Low
37            VerticalBackPorch =
38            {
39                    35 * {
40                            Length =
                                1.0H,
41                            Low = 0,
42                            High =
                                Horizontal-
                                Sync
43                    }
44            }
45
46            Initial High
47            Active = {
48                    1024 * {
49                            Length =
                                1.0H,
50                            Low = 0
51                            High =
                                Horizontal-
                                Sync
52                    }
53            }
54    }
```

Referring to Table 1, the VOF input file 100 comprises two sections, a general description that appears as a series of assignment statements, and a line-by-line section which describes the timing of the sync signal. The general description section (Table 1, lines 5 through 14) provides a general description of the overall frame by specifying the values for the parameters of a frame. This information can be read off a spec. sheet provided by the manufacturer of the display device. Table 2 includes a definition and the units for each of the required parameters.

TABLE 2

Required Fields In General Description

| Field Name | Description | Units |
| --- | --- | --- |
| FieldsPerFrame | The number of fields in one field of video. For standard computer (non-interlaced) displays, this value is one (1); for broadcast television (interlaced) displays, this value is two (2). | integer |
| FramesPersecond | The number of frames of video per second of video. This must be an integer number (i.e., no fractional component is permitted). | integer |
| TotalLinesPerFrame | The number of lines in the frame, including all vertical blanking lines. | integer |
| TotalPixelsPerLine | The number of pixels in one line of video, including all | integer |

TABLE 2-continued

Required Fields In General Description

| Field Name | Description | Units |
| --- | --- | --- |
| | horizontal blanking pixels. | |
| ActiveLinesPerFrame | The number of lines in the frame that contain picture content (i.e., the number of lines exclusive of vertical blanking lines). | integer |
| ActivePixelsPerLine | The number of pixels in the line that contain picture content (i.e., the number of pixels in a line exclusive of horizontal blanking pixels). | integer |
| HorizontalBackPorch | The duration of the back porch on each line (the length of time between the rising edge of horizontal sync and the rising edge of active video). | time |
| HorizontalFrontPorch | The duration of the front porch on each line (the length of time between the falling edge of active video and the falling edge of horizontal sync). | time |
| HorizontalSync | The duration of horizontal sync. | time |

Figure 2:
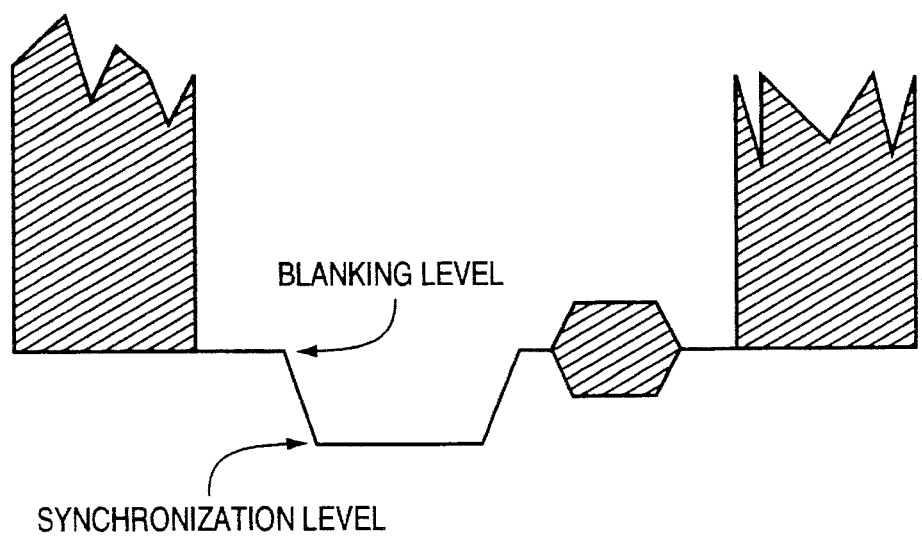
FIG. 2 is an illustrative example of a video signal showing synchronization during horizontal blanking.

The line-by-line description section provides overall timing information for the sync signal. As discussed above, the sync signal may be unique between formats. Therefore, the pattern of the sync signal must be described in some detail. The sync signal is manipulated during the horizontal and vertical blanking portions of the video signal. Sync has two states: high and low. When the sync state is low, the video output formatter 104 sets the voltage of the output video signal to synchronizing level, and when the sync state is high, the voltage is set to blanking level. FIG. 2 shows an example of a video signal showing synchronization during horizontal blanking.

The line-by-line description section of the VOF input file 100 (Table 1, lines 16 through 54) provides instructions that specify when the sync signal changes from one state to another. The first line of this section identifies the field by a number; the first field number is field zero (Field=0). If the format has one field, that field is identified as field zero. The initial condition statement is an optional statement that can be used by the user to ensure the sync signal is at the correct state at a specified position in the frame. As shown in FIG. 2, the state of sync varies between high (blanking level) and low (synchronization level). This statement does not change the state of the sync signal; it simply verifies that the state of the signal is as specified. Next, each of the different vertical portions of the frame is described. The different portions of the frame are vertical front porch, vertical sync, active and vertical back porch. Each portion is defined by a set of instruction that specify a series of sync transitions. A "length" instruction describes the duration of the set. The "Low=time" and "High=time" instructions specify where to place the sync signal; at blanking level (high) or synchronization level (low). Each of the sets is concatenated to the end of the previous set. Thus it is possible to build complex portions of a frame by specifying subsequent instruction sets.

Figure 3:
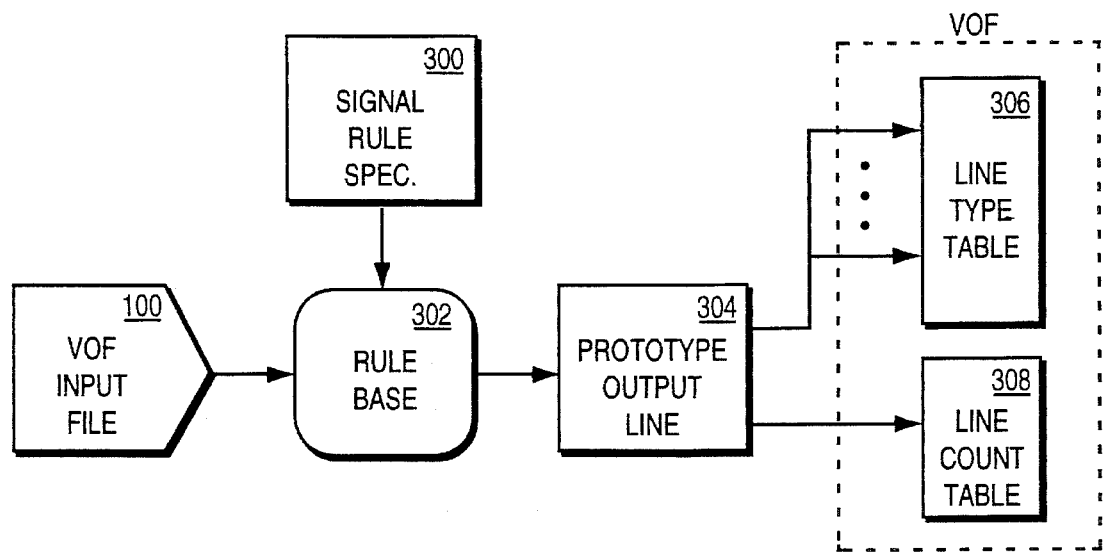
FIG. 3 shows the process by which the video format compiler of the present invention creates the video format.

After the user completes the VOF input file 100, it is read by the compiler 102. FIG. 3 shows the process by which the compiler 102 creates the video format using the VOF input file 100. After reading the user's VOF input file 100, the compiler 102 reads a signal rule specification (SRS) file 300.

The SRS file 300 is a pre-determined table describing all timing relationships between the various video signals (relative to the video sync signal), such as blank, video address request, cursor pulse, and horizontal and vertical blanking interval timing. Based on the line and frame timing information provided by the user and the pre-determined timing relationships described by the SRS file 300, the compiler 102 constructs a rule base 302 that describes, for every video signal, where state changes occur within a frame. The rule base 302 is used as a source for constructing each line of the frame, represented as the prototype output line 304. Once all such prototype output lines of video have been constructed, the compiler 102 collapses all common occurrences of a prototype definition into a single line type, with an associated repetition count.

A line type is simply a definition of all signals for a line. Each line type is unique among all line types defined for a format. For example, the simple frame shown in FIG. 4 contains a line type for the vertical front porch 400, a line type for the active portion 402 of the frame, and a line type for the vertical back porch 404. In the example shown in FIG. 4, the contents of the line in the active portion 402 is different than the content of the lines in either of the vertical blanking intervals 400 and 404.

Referring back to FIG. 3, the compiler then groups the several different line types together in a line type table 306, and the number of times each line type is to be executed in a line count table 308. These tables define the complete video output format (i.e. all the signal timing required for each line in the video format) as defined by the user's VOF input file 300.

The function of the video output formatter 104 is to receive the tables generated by the compiler 102 and to implement the format. The operation of the video output formatter 104 is based on a repetitive execution of a short set of instructions that describe the different portions of the frame. A programmable state machine is used to perform this operation. Once the programmable state machine is loaded with information in the tables generated by the compiler (that contain the video output format), a resetable, free-running counter keeps count of the total number of lines to be formatted. Every count specifies a particular line type which instructs the rest of the state machine how to generate the signal within the pixel line.

Figure 5:
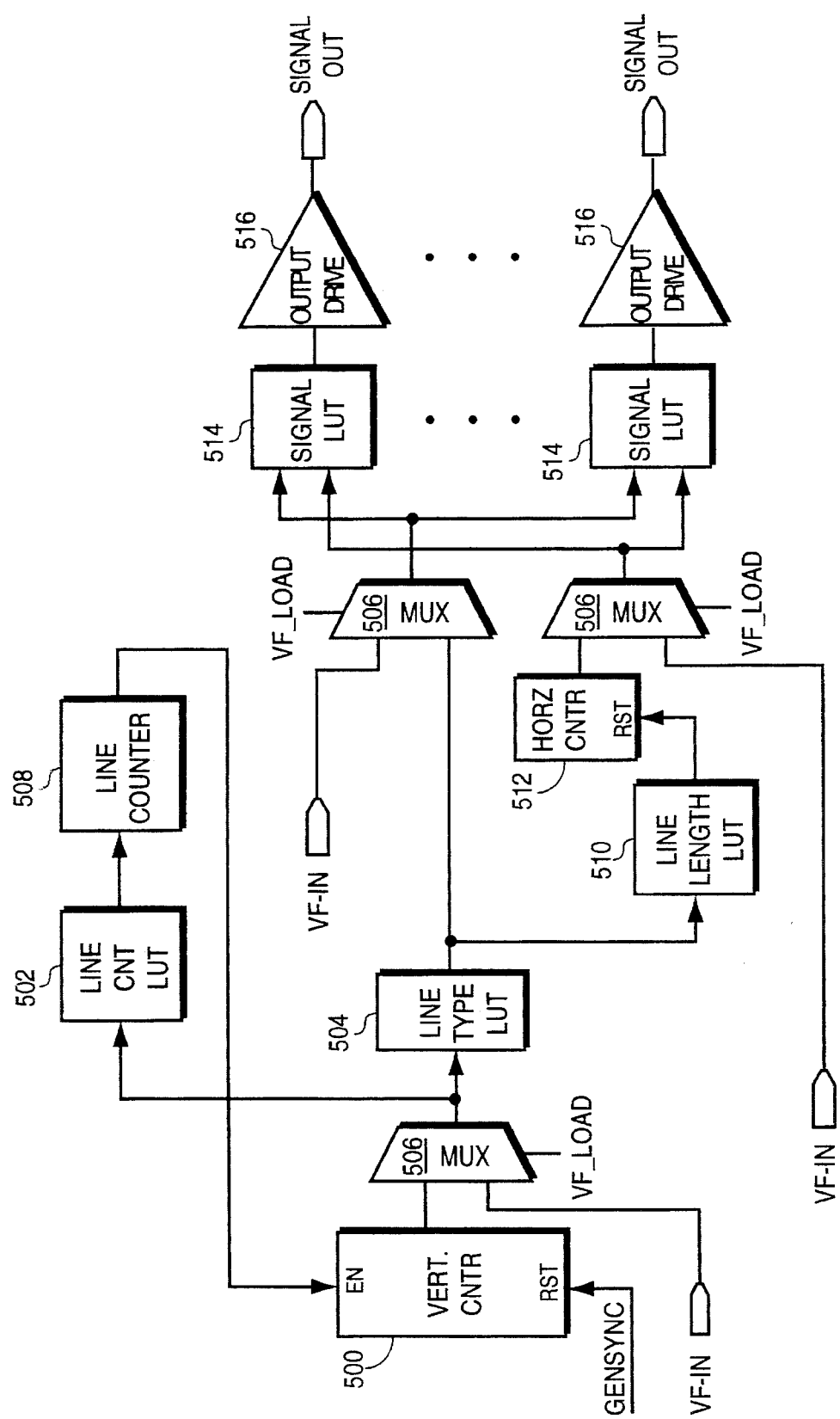
FIG. 5 is a simplified example of a state machine implementing the video output formatter.

FIG. 5 is a simplified example of a state machine implementing the video output formatter 104. A free-running vertical counter 500 generates a next state number which acts as an index to look-up tables (LUTs) inside the state machine. The output of the vertical counter 500 connects to a line count LUT 502 and a line type LUT 504 through a multiplexer (MUX) 506. The line type LUT 504 stores information on the line types associated with a specific count, and the line count LUT 502 stores the number of line types. Line count LUT 502 drives a line counter 508 that performs the counting of the line types. The output of the line counter 508 connects to a next line enable input of the vertical counter 500. The output of the line type LUT 504 connects to a line length LUT 510. The line length LUT 510 contains information on the length of each line (e.g. full, half or quarter line). This information is loaded onto a free-running horizontal counter 512 which counts the loaded size of the line. The outputs of the line type LUT 504 and the horizontal counter 512 connect to inputs of signal LUT's 514 through MUXes 506. The signal LUT's 514 generate the output video signals that are driven by output drivers 516.

In operation, the video output formatter state machine must first be loaded with the video format generated by the compiler. A signal, VF Load, controls all MUXes 506 such that the inputs of all LUT's of the state machine are connected to receive the video format information from the compiler output. Once all LUT's are loaded (or programmed), the VF Load signal is switched to connect the LUT's to the counters. The vertical counter 500 can then begin the count.

Figure 4:
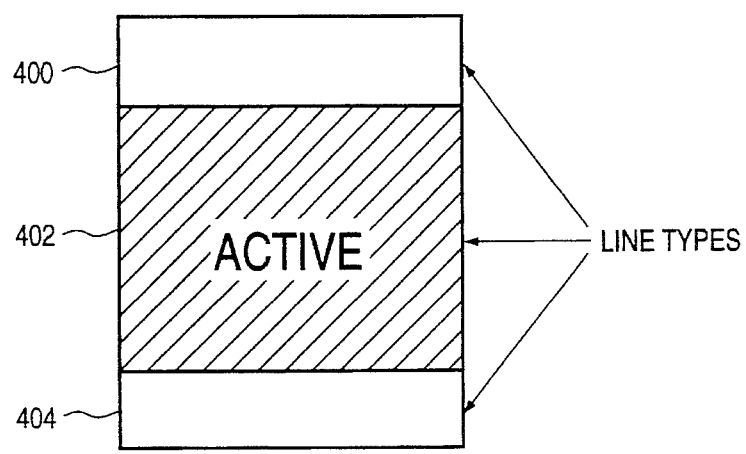
FIG. 4 shows a simple video frame illustrating different video line types.

Using the simple video frame shown in FIG. 4 as an example, the very first line of the frame (i.e. vertical count zero) is a vertical blanking line type. Therefore, for vertical count zero the content of the line type LUT 504 shows a blanking line type. The value stored in line count LUT 502 for this count reflects the number of times this particular line type is to be repeated. Thus, line counter 508 counts until it reaches the line count value stored in LUT 502. For this entire count period, signal LUT's 514 receive a vertical blanking line type through the line type LUT 504. In addition to the line type information, the signal LUT's 514 receive the horizontal pixel count from the horizontal counter 512. The signal LUT's 514 store a value for every horizontal pixel count along a line. Therefore, for a given combination of the line type information and horizontal pixel count, the signal LUT's 514 generate the desired video signal as programmed by the compiler output. Once the full count for this line type is reached, line counter 508 triggers the vertical counter 500 to start count for the next line type; in this example, active line type. This process is continued until the vertical count reaches the bottom of the video frame, by which time the video output format for the entire video frame has been generated. The vertical counter 500 is reset, and the formatting of the next frame begins. The vertical counter 500 can also be reset externally by a gensync signal that connects to a reset input. This enables the resetting of the state machine at the beginning of every frame as dictated by another system which runs at a different speed.

In conclusion, the present invention provides a programmable video output format (VOF) generator that enables a processing system to drive an arbitrary display device with minimal input information. The programmable VOF generator of the present invention achieves this by providing a compiler that allows a user to specify a video format in a high-level language, without requiring specialized knowledge of the video display system. The compiled information is then loaded onto a state machine that is capable of being dynamically programmed. The state machine then generates the desired video output format.

While the above is a complete description of a specific embodiment of the present invention, it is possible to use various alternatives, modifications and equivalents. For example, the specific language of the VOF input file that is generated by the user can be modified to further facilitate the user interface. For example, the file can be generated by a menu driven program whereby the user only responds to a series of questions. Also, the specific hardware implementation of the state machine, including the loading mechanism and use of lookup tables, can be realized a number of different ways. Therefore, the scope of the present invention should be determined not with reference to the above description but should, instead, be determined with reference to the appended claims, along with their full scope of equivalents.

What is claimed is:

1. A programmable video output format generator comprising:
    a video format compiler having an input for receipt of a display format program, said compiler deriving a plurality of timing information from said display format program and outputting said plurality of timing information at an output; and
    means, coupled to said video format compiler, for generating a plurality of video display signals in response to said plurality of timing information, said means for generating comprising a reprogrammable state machine including,
        a vertical counter to run said state machine,
        a programmable line type storage means, coupled to said vertical counter, for storing a plurality of video line types,
        a programmable line count storage means, coupled to said vertical counter, for storing a plurality of line count values,
        a line counter, coupled to said programmable line count storage means, for counting said line count values,
        a horizontal counter, coupled to said programmable line type storage means, for counting a plurality of elements across a video line, and
        a programmable signal storage means, coupled to said programmable line type storage means and said horizontal counter, for generating a plurality of video output signals,
    wherein, by modifying said display format program, the programmable video output format generator can generate different video output formats for connecting to different video display devices having arbitrary video output format requirements.

2. The programmable video output format generator of claim 1, wherein said display format program includes arbitrary synchronization information.

3. A programmable video output format generator comprising:
    a video format compiler having an input for receipt of a display format program, said compiler deriving timing information from said display format program and outputting said timing information at an output; and
    a reprogrammable state machine, coupled to said video format compiler, for generating a plurality of video display signals in response to said timing information, said reprogrammable state machine including:
        a vertical counter to run said state machine;
        a programmable line type storage means, coupled to said vertical counter, for storing a plurality of video line types;
        a programmable line count storage means, coupled to said vertical counter, for storing a plurality of line count values;
        a line counter coupled to said programmable line count storage means, for counting said line count values; and
        means, coupled to said programmable line type storage means, for defining locations of transitions in horizontal line.

4. The programmable video output format generator of claim 3, wherein said means for defining comprises:
    a horizontal counter, coupled to said programmable line type storage means, for counting a plurality of transitions across a video line; and
    a programmable signal storage means, coupled to said programmable line type storage means and said horizontal counter, for generating a plurality of video output signals.

* * * * *